July 19, 1932. H. G. PONTING ET AL 1,868,252
CINEMATOGRAPHIC APPARATUS
Filed March 11, 1922 4 Sheets-Sheet 1

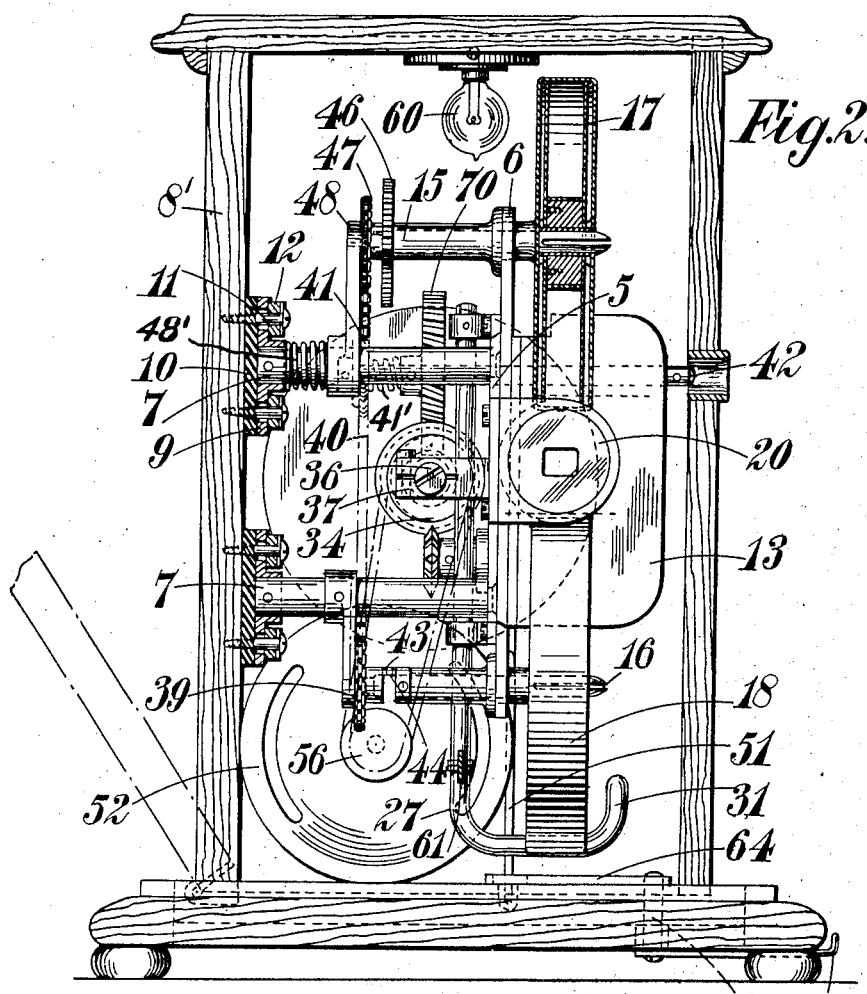
Fig.2.
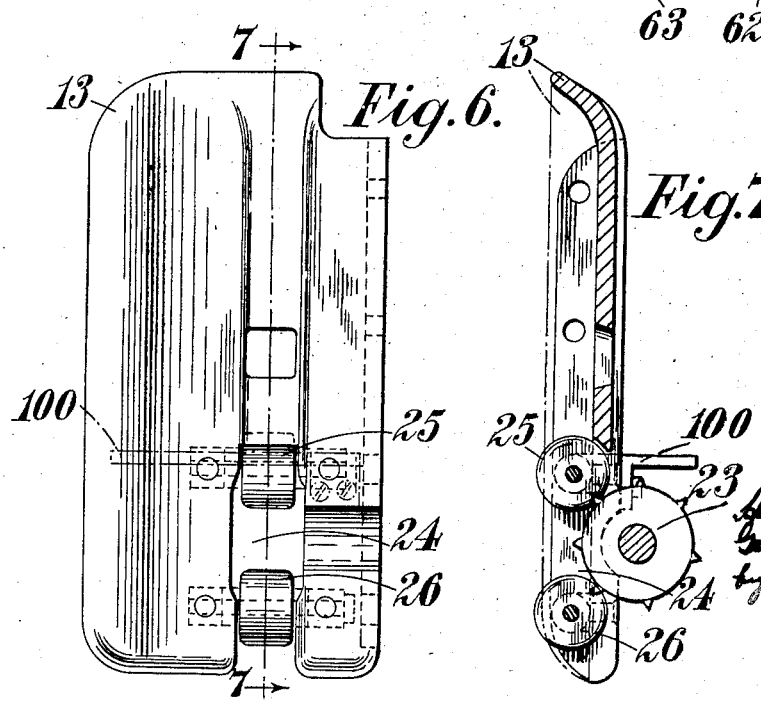
Fig.6.
Fig.7.

July 19, 1932.  H. G. PONTING ET AL  1,868,252
CINEMATOGRAPHIC APPARATUS
Filed March 11, 1922  4 Sheets-Sheet 3
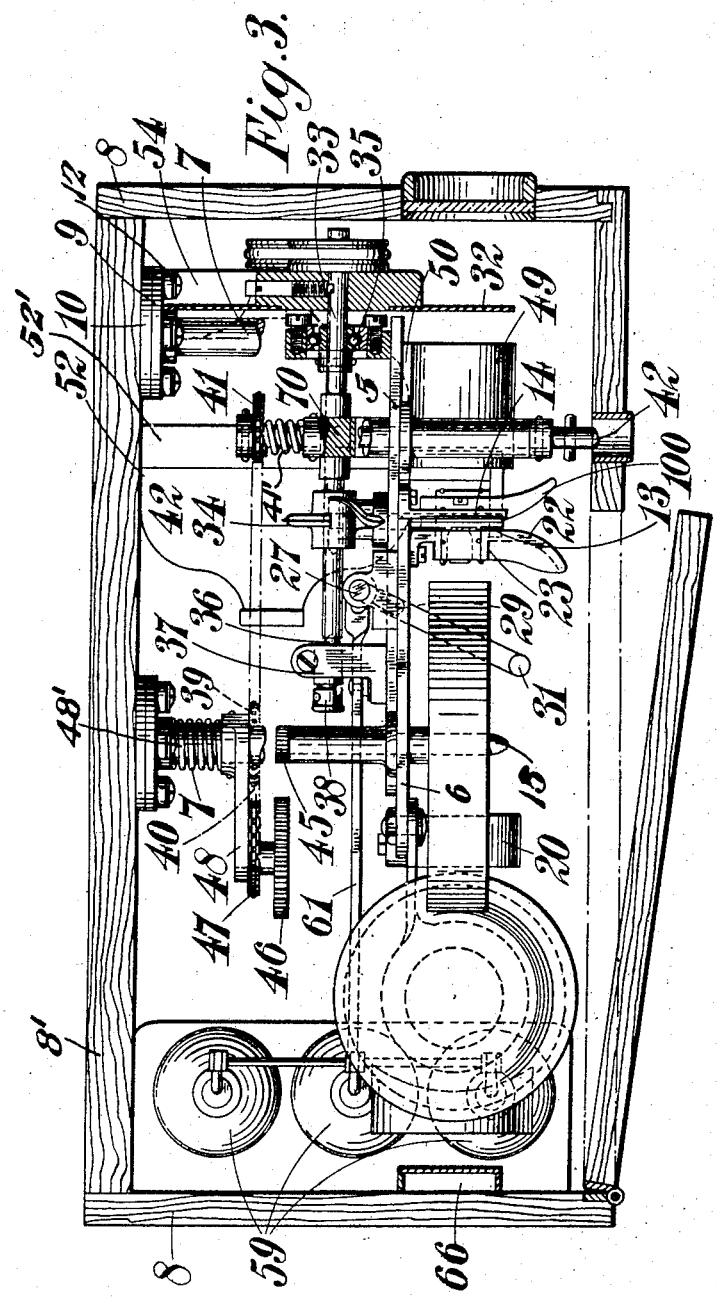

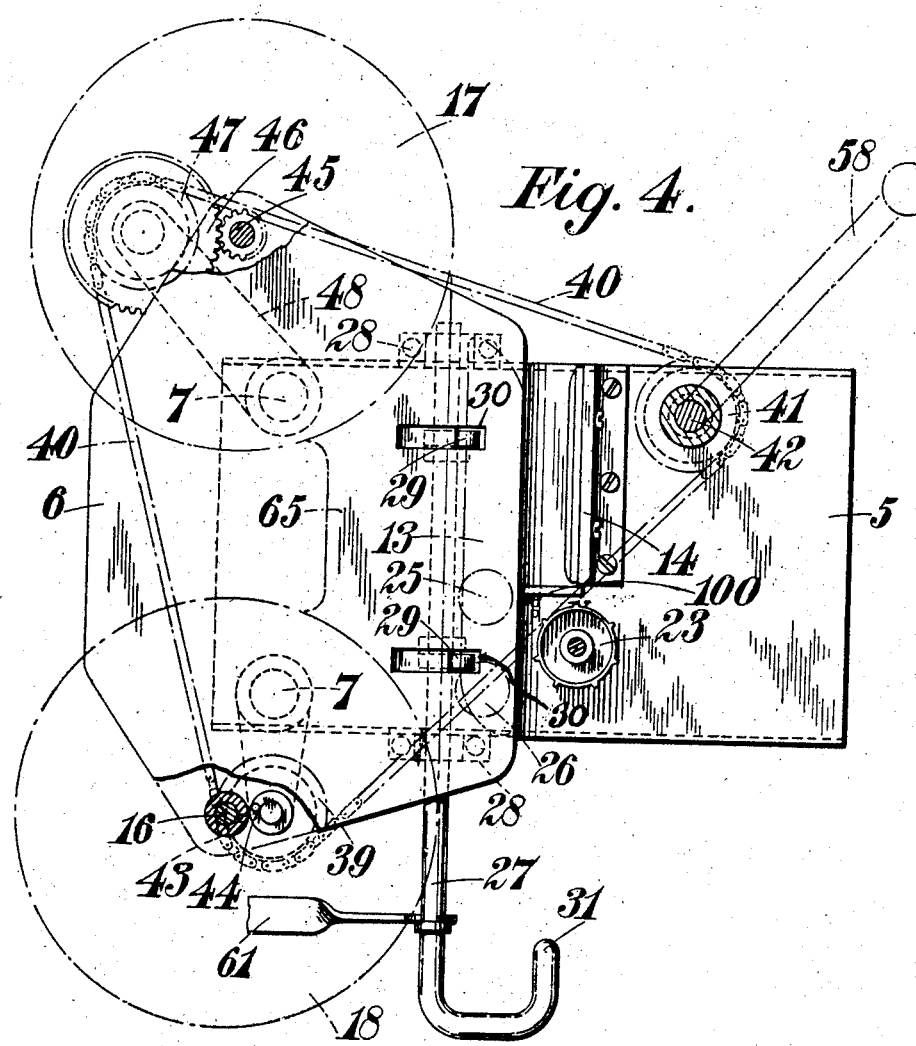
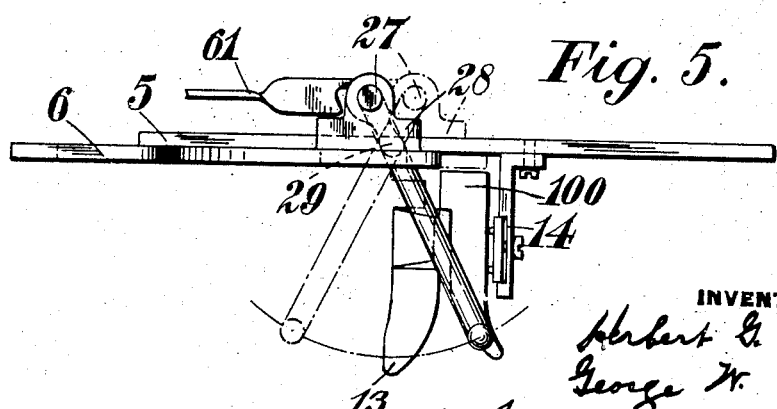

UNITED STATES PATENT OFFICE

HERBERT GEORGE PONTING, OF LONDON, AND GEORGE WILLIAM FORD, OF KENSINGTON, LONDON, ENGLAND, ASSIGNORS, BY MESNE ASSIGNMENTS, TO KINATOME PATENTS CORPORATION

CINEMATOGRAPHIC APPARATUS

Application filed March 11, 1922, Serial No. 542,898, and in Great Britain March 30, 1921.

This invention relates to cinematographic apparatus, that is projector or camera apparatus, and in particular to such apparatus when constructed in portable form such as is suitable for domestic, as contrasted with public, cinematographic displays.

Heretofore the operation of threading the film through the gate and over the driving sprockets preparatory to display has in general been a tedious one, owing to the construction of the parts involved, which objection is not entirely eliminated by a known construction of portable device for domestic use in which construction the front portion of the gate is made movable relatively to the rear portion. This invention seeks further to facilitate the operation of inserting a new film by improving the construction of the parts involved.

The present invention provides cinematographic apparatus having the film gate constructed in two separate portions, a front and a rear, each upon a support distinct from that of the other, of which supports one carries the film spools and is movable relatively to the other to close and open the gate by bringing the portion upon it towards and away from the fellow portion (for example by a movement of translation of the gate-portion parallel to itself).

This invention also provides cinematographic apparatus having a gate constructed as above stated and further having upon one of the said two supports guides for the film so situated as normally to hold the film in driven engagement with a film-driving sprocket upon the other said support and by the said movement of one support for the purpose of opening and closing the gate to cause the film to be engaged with and disengaged from the driving sprocket.

A further construction provided by this invention is one wherein cinematographic apparatus such as is above defined, is provided with rewinding gear for engagement with the film spool, so constructed and situated as normally to be disengaged but to be engaged with the film spool by the movement of the support for disengaging the film from its driving-sprocket.

The foregoing and other features of the invention will be more clearly understood from the following detailed description with reference to the accompanying drawings which illustrate one preferred construction of cinematographic apparatus according to this invention.

In these drawings:—

Figure 2 is a part-sectional end elevation of the apparatus shown in Figure 1 looking towards the front of the machine;

Figure 3 is a part-sectional plan of the apparatus;

Figure 4 is a view corresponding to Figure 1 of a portion of the apparatus showing the position of the gate and associated parts when in the "open" position;

Figure 5 is a fragmentary plan view showing the operating mechanism for the sliding plate;

Figure 6 is a detailed view of the rear portion of the gate looking on the front face thereof and drawn to a larger scale, and Figure 7 is a sectional view on the line 7—7 of Figure 6.

Like reference numerals indicate like parts throughout the drawings.

Figure 1:
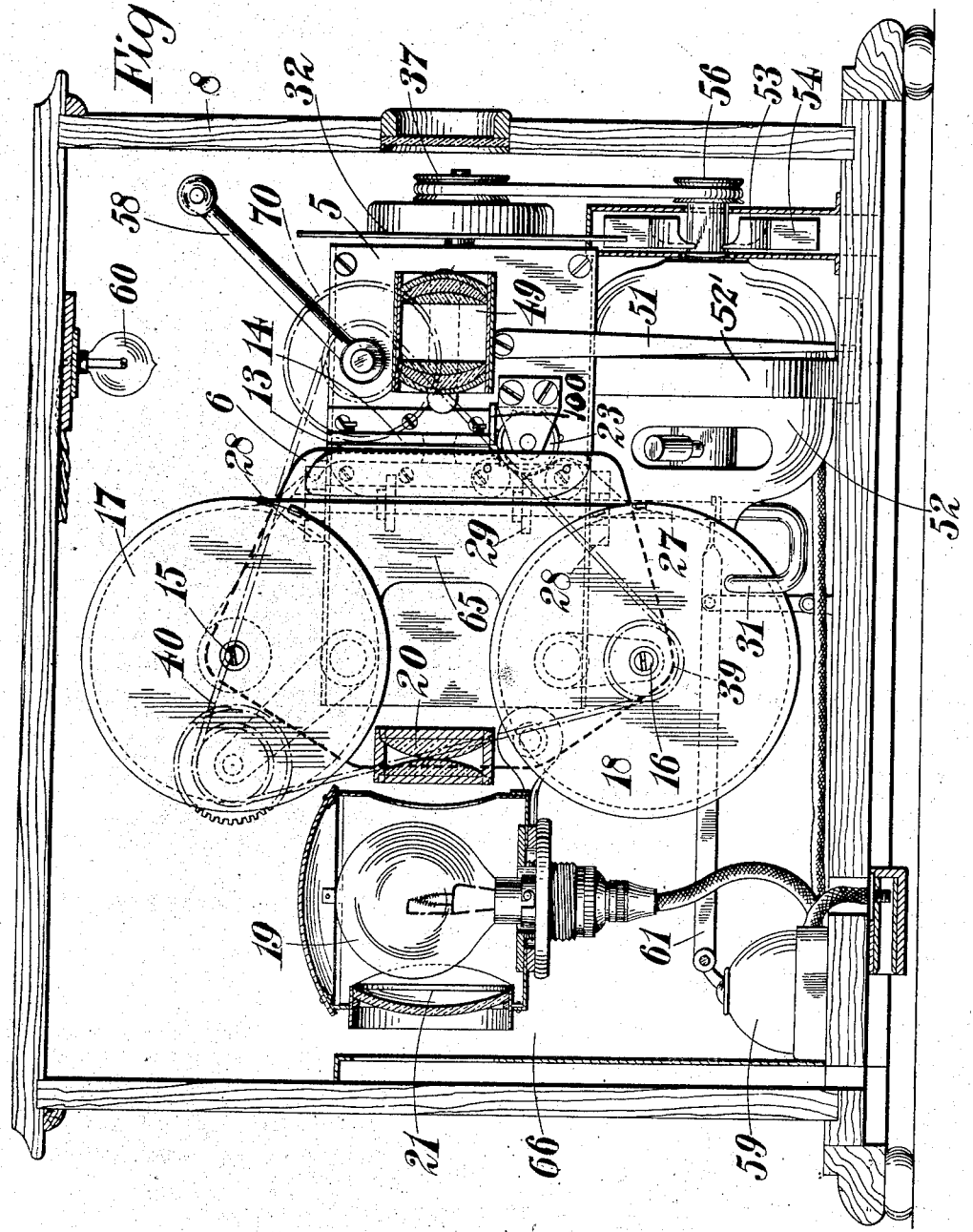
Figure 1 is a part-sectional side elevation of the apparatus.

The main frame of the machine comprises two main plates 5 and 6 whereof one 5, herein termed the "fixed plate" is carried by pillars 7 secured to one wall of an enclosing cabinet 8 and the other of which, herein termed the "sliding plate" is slidably mounted upon the first. Between the feet 9 of the said pillars 7 and the wall of the cabinet, rubber washers 10 are inserted for the sake of reducing noise and the feet are clamped upon these washers by screws 11 passing through other rubber washers 12 and clearing the holes in the feet. This construction is described and claimed in our co-pending divisional application, Serial Number 440,389, filed March 31, 1931. The sliding plate 6 carries the rear portion 13 of the gate together with the two spindles 15 and 16 for the film spools 17 and 18, the projection lamp 19, the condenser 20, and a reflector 21, situated to the rear of the lamp.

The front half 14 of the gate projects from the fixed plate 5. The disposition of the parts is therefore such that sliding movement of the one plate upon the other causes the gate to be opened and closed and when open to give access to the gate along one edge 22 which will hereinafter be called the mouth of the gate.

The rear portion 13 of the gate has three of its edges curved, namely, the upper and lower and that which forms one side of the mouth of the gate and which projects in that direction towards which the free ends of the film spool spindles project. The film-sprocket 23 is carried on the fixed plate 5 just beyond the delivery end of the gate, and a guide piece 100 is provided projecting forwardly from the rear portion 13 of the gate and carried thereby so as to pass between the delivery end of the gate and the film sprocket 23. This guide 100 is in the form of a nose-piece whose free end projects towards the mouth 22 of the gate, that edge of the nose-piece which is towards the rear half of the gate is curved to assist in guiding the film into the mouth of the gate.

The rear portion 13 of the gate is apertured at 24, see Figure 6, to allow the film-sprocket 23 to project through it when the gate is closed, and above and below this aperture are mounted guide rollers 25 and 26 for the film which, when the gate is closed, cause the film to lap around part of the film sprocket periphery and so be drivingly engaged therewith. On the other hand when the gate is opened the film is free of the said engagement with the sprocket.

The gate operating mechanism is in the form of a spindle 27 carried in bearings 28 on the sliding plate 6, one above and the other below the fixed plate 5 which carries the front portion of the gate and the said gate-opening spindle 27 carries two cranks arms 29 which engage recesses in the said fixed plate 5. The lower end of the said spindle is bent to provide an operating handle 31.

The gate and members associated therewith are described and claimed in our co-pending application, Serial Number 392,890, filed September 16, 1929, which upon November 19, 1929, matured as patent Number 1,736,730.

To the rear of the fixed plate 5, that is to say, on that side which is remote from the gate, is mounted the step-by-step feed mechanism and the driving mechanism for the shutter. The shutter 32 is carried upon a spindle 33 having a spiral cam 34 for operating the step-by-step mechanism and is carried at its forward end in a ball-bearing 35 and its rear end is received by a hollow centre formed eccentrically on a pin 36 that is rotatably mounted in a bracket 37 carried upon the fixed plate. The said pin 36 is pierced by a duct, one end of which communicates with the hollow forming the centre and whose other end terminates in a suitable oiling device 38.

The two film spool spindles 15 and 16 project through the sliding plate 6 and the "take-up" spindle 16 is provided with a clutch serving to connect and disconnect it with a driving sprocket 39 operated by an endless chain 40 passing over a sprocket 41 loosely mounted on the main driving spindle 42 and driven through the spring 41' in the manner later described. The clutch referred to is constituted by a single pin 43 projecting from the end of the spindle 16 parallel to the axis of rotation of the latter and serving to engage with an oppositely directed pin 44 projecting from the chain sprocket 39.

The paying-out film spool spindle 15 carries at one end a pinion 45 which, in the closed position of the gate is entirely free but which, when the gate is opened is brought into engagement with a driving spur wheel 46, carried upon a chain sprocket 47 over which the aforesaid endless chain 40 passes. This latter chain sprocket and spur wheel are mounted on an arm 48 which arm is loosely mounted upon the upper rear pillar 7 and controlled by the spring 48' which is coiled about the pillar 7 with one end fixed to the arm 48 and the other fixed to the pillar and hence capable of a limited movement of rotation about an axis parallel to that of the spool spindles.

The objective lens 49 is carried on the fixed plate, forward of the gate, being mounted in a bracket 50 that is slidable in said plate under the control of a lever 51 extending downwardly from the plate towards the base of the instrument.

The whole projector is enclosed within a case or cabinet 8 and near the bottom of the cabinet is mounted an electric motor 52, which is attached to the hinged plate 8' by the strap 52' for driving the projector and serving also to ventilate the cabinet. The latter function is provided for by means of a fan 53 on an extension of the armature spindle of the motor enclosed in a housing 54 having an opening at its bottom communicating through an opening in the bottom of the cabinet with the outer air. On the armature spindle is a driving pulley 56 connected by a belt with a pulley 37 on the front end of the shutter spindle 33 which drives through the skew gear 70 the spindle 42. The gear 41 is yieldingly driven by gear 70 through the spring 41'.

An operating handle 58 (shown in position in Figure 1) is provided as an alternative means of driving the projector, and is adapted to engage the free end of the cross spindle 42 carrying the chain sprocket 41.

In the base of the cabinet are mounted three switches 59, namely, the motor switch, the lamp switch, and a switch for a small pilot lamp 60 provided inside the cabinet. The operating spindle 27 for the gate is connected with these three switches by a link 61, so that the operation of opening the gate automatically breaks the motor and projection lamp circuit and closes the pilot lamp circuit and the closing of the gate reverses these operations. If desired the connection between the gate operating spindle and the switches may be such that the operation of opening the gate first opens the motor circuit then cuts off the supply to the projection lamp and finally closes the circuit to the pilot lamp, and the operation of closing the gate reverses these operations.

Outside the base of the cabinet a lever 62 is provided connected by a short spindle 63 to a corresponding lever 64 on the inside, slotted to receive the tail of the lever 51 above referred to as connected with the objective lens 49. The pillars 7 carrying the main frame of the machine are secured to one of the walls 8' of the cabinet and this latter is hinged, conveniently about its lower end so that the whole machine can be swung out from within the cabinet upon its supporting wall for inspection and adjustment. Conveniently the two film spool cases are mounted together with a connecting bridge 65 to constitute a single unit carrying the film so that the film spools are never taken out of the cases when once mounted therein.

To operate the machine a pair of spool cases with their enclosed film are slipped upon the free ends of the spool spindles 15 and 16, the gate having been previously opened by means of the operating handle 31. This operation has interrupted the motor circuit and lamp circuit and has closed the circuit to the pilot lamp. As the spools are slipped on their spindles the film passes readily over the curved edge of the rear portion 13 of the gate being prevented from projecting too far forwards and thus fouling the sprocket 23, by means of the nose guide 100 whose rearwardly directed curved edge co-operates with that of the gate portion to guide the film smoothly into the gate proper. The rear portion 13 of the gate is grooved to receive the film in its proper position. The gate is then closed and the approach of the rear portion 13 towards the front 14 causes the guide rollers 25 and 26 for the film to press the latter closely around the periphery of the sprocket 23 as the latter enters and passes through the aperture 24 in the rear portion of the gate. At the same time the "take-up" spool spindle 16 is brought into position to be clutched by the chain sprocket 39 for driving it and the three switches 59 in the base are operated as above described. The linkage between the gate-operating handle and the switches is such as to provide the necessary lost motion to enable the required snap action of the switches.

Any required adjustment of the objective lens 49 for focusing purposes is carried out by means of the lever 62 in the base of the cabinet, the proportions of the levers being such as to afford a fine adjustment: the speed of the motor may conveniently be adjusted by rocking the brushes instead of by the usual resistance control.

When the film has been run through, the gate may be opened and the movement of the sliding plate 6 thereby declutches the "take-up" spindle 16 from its driving sprocket 39 and throws the pinion 45 on the "paying-out" spindle 15 into engagement with the spur wheel 46 for rotating it. The proportions of this pinion and spur wheel are such in relation to the chain sprockets in which the endless chain 40 passes, that the "paying-out" spindle will be rotated by the chain at a considerably higher angular velocity than the "take-up" spindle and, obviously, in the reverse direction since this serves to rewind the film and, owing to the yielding drive of the spur wheel 46 through the spring 41', the end of the film is not torn loose from the "take-up" spindle at the conclusion of the rewinding operation. Owing to the yielding control of the arm 48 carrying the spur wheel 46, engagement with the pinion 45 on the "paying-out" spindle is effected without difficulty or damage.

As wear takes place on the shutter spindle 33 or in the step-by-step cam mechanism, rotation of the pin 36 forming the rear bearing for the spindle serves to take up the backlash: this bearing is, moreover, readily lubricated by means of the device 38 above referred to.

The rewinding of the film can be effected by the handle 58 or, if desired, a subsidiary switch may be provided to close the motor circuit again after it has been opened automatically by the gate-operating lever.

The fan 53 serves to expel air from the cabinet through the opening in the base and an inlet for the air is provided which is at the rear of the projection lamp 19 through a duct 66 communicating with an opening in the base of the cabinet. No light therefore, escapes either through the inlet or the outlet for air and the discharge of the inlet duct being arranged in close proximity to the lamp ensures sufficient cooling.

We claim:

1. In film handling apparatus the combination of a film gate constructed in two separate portions, a front portion and a rear portion, a fixed support for one of said portions, a support for the other said portion movable relatively to said fixed support, a film spool on said movable support, driving means for said film spool on said fixed support, and means co-operating with said film spool to engage said driving means when the support is moved to close the gate and to be disengaged therefrom when the support is moved to open the gate.

2. In a film handling apparatus in combination a film-gate constructed in two separate portions a front portion and a rear portion, a fixed support for one of said portions, a support for the other said portion movable relatively to said fixed support, a pair of film-spools on said movable support, driving means upon said fixed support for said film-spools, means on one of said spools to engage said driving means when the support is moved to close the gate and means on the other said spool to engage said driving means when the support is moved to open the gate to drive said spool in the reverse direction, for the purpose of rewinding the film.

3. In a film handling apparatus in combination a film-gate constructed in two separate portions a front portion and a rear portion, a fixed support for one of said portions, a slidable support for the other said portion, means for moving said slidable support relatively to said fixed support in a direction along the optical axis of the machine, a pair of film-spool-spindles on said slidable support, driving means on said fixed support for said spindles, a pin projecting from one of said spindles parallel to the axis of rotation thereof, but eccentric thereto a spindle, driven by said driving means, a pin on said spindle parallel to the axis of rotation thereof, but eccentric thereto and directed towards said film-spool-spindle to engage said pin thereon when said spindles are coaxial.

4. In a film handling apparatus in combination a film-gate constructed in two separate portions a front portion and a rear portion, a fixed support for one of said portions, a slidable support for the other said portion, means for moving said support relatively to said fixed support in a direction along the optical axis of the machine, a pair of film-spool-spindles on said slidable support, driving means for said spindles on said fixed support, a gear wheel on one of said spindles, a resiliently mounted arm on said fixed support, a gear wheel on said arm driven by said driving means and arranged to engage the gear wheel on said spool-spindle when the said slidable support is moved to open the gate to rotate said spool-spindle in a direction for rewinding the film and to be free of said engagement when the gate is closed.

5. In a cinematograph projector in combination a film-gate constructed in two separate portions a front portion and a rear portion, a fixed support for one of said portions, a movable support for the other said portion, means for moving said support relatively to said fixed support, an electric projection-lamp, a switch for said lamp, an electric motor for driving said projector a switch for said motor and means for operating said switches by the movement of said moving means to break the circuits to said lamp and said motor when the gate is opened and to close said circuits when the gate is closed.

6. In a cinematograph projector in combination a film-gate constructed in two separate portions a front portion and a rear portion, a fixed support for one of said portions, a movable support for the other said portion, means for moving said support relatively to said fixed support, an electric projection lamp, a switch for said lamp, an electric motor for driving said projector, a switch for said motor, means for operating said switches upon the movement of said movable support to break the circuits to said lamp and said motor when the gate is opened and to close said circuits when the gate is closed, a pilot lamp for said projector, a switch for said pilot lamp, means for operating said switch to close the circuit to said pilot lamp when the gate is open, and to break the circuit thereto when the gate is closed.

7. In a film handling apparatus, the combination of a film-gate, a lamp for supplying light at said film-gate, and a driving motor, rotatable means for causing a film to travel past said film-gate, shiftable means for normally retaining said film in engagement with said rotatable means, means for shifting said retaining means into and out of operative position, and means actuated by said shifting means to control the motor and lamp circuits.

8. In film handling apparatus, the combination of a film-gate, a lamp for supplying light at said film-gate, a driving motor, rotatable means for causing a film to travel past said film-gate, shiftable means for normally retaining said film in engagement with said rotatable means, means for shifting said retaining means into and out of operative position, switches in the motor and lamp circuits, and means actuated by said shifting means to close and open said switches when the retaining means is in operative and inoperative position respectively.

9. In a film handling apparatus, the combination of a film gate, a lamp for supplying light at said film-gate, a driving motor, a sprocket adapted to engage a film and cause it to travel past said light station, a shiftable shoe normally engaging said film and retaining it in engagement with said sprocket, means for shifting said shoe into and out of operative position, and means actuated by said shifting means for opening the motor and lamp circuits when the shoe is in its inoperative position.

10. In a film handling apparatus, the combination of a film-gate, a lamp for supplying light at said film-gate, a driving motor, means for moving a film past said film-gate, shiftable means for normally retaining said film in engagement with said moving means, means for shifting said retaining means out of operative position, switches in the motor and lamp circuits, a reciprocating member having means for opening and closing said switches and means carried by said shifting means for operating said reciprocating member.

11. In a film handling apparatus, a gate, a film-engaging member for feeding a film past said gate, means for initially moving the film in relation to said film feeding member to thread the film, a pilot light for illuminating said member and means during the threading operation, a switch for said pilot light, and control mechanism interlocking said switch and said film moving means for operating said switch and said film moving means in timed relation.

12. In a motion picture apparatus, two film supporting members, a gate positioned therebetween, means for feeding a film from one of said members through said gate toward the other of said members, a main light source of relatively high intensity adapted to project an image from a film positioned within said gate while it is being fed therethrough, an auxiliary light source of relatively low intensity adapted to illuminate said gate for the purpose of facilitating the positioning of a film therein, and interconnected switches for both of said light sources whereby the circuits for said light sources are rendered alternately effective.

13. In a motion picture apparatus, two film supporting members, a gate positioned therebetween, means for feeding a film from one of said members through said gate toward the other of said members, a main light source of relatively high intensity adapted to project an image from a film positioned within said gate while it is being fed therethrough, an auxiliary light source of relatively low intensity adapted to illuminate said gate for the purpose of facilitating the positioning of a film therein, and means whereby said light sources are rendered alternatively effective upon said gate.

14. In a motion picture apparatus, two film supporting members, a gate positioned therebetween, means for feeding a film from one of said members through said gate toward the other of said members, a main light source of relatively high intensity adapted to project an image from a film positioned within said gate while it is being fed therethrough, a pilot light of relatively low intensity adapted to illuminate said gate for the purpose of facilitating the positioning of a film therein, and means whereby said pilot light is rendered inoperative when said main light source is rendered operative.

15. In a film handling apparatus, feeding mechanism for a film, means for driving said mechanism, a pilot lamp adapted to illuminate said mechanism for the purpose of facilitating the positioning of a film relatively thereto, and a single control means necessarily effective for rendering said pilot lamp ineffective and said driving means operative.

16. In a motion picture apparatus, in combination two film supporting spindles, a film gate constructed in two separate portions, said film gate being positioned between said film supporting spindles, a fixed support for one of said portions, a movable support for the other said portion, means for moving said movable support relatively to said fixed support whereby the gate is closed or opened, means for feeding a film supported upon one of said spindles through said gate and toward the other of said spindles, a pilot lamp for said apparatus, a switch for said pilot lamp, and means for operating said switch by the movement of said movable support to break the circuit to said pilot lamp when the gate is closed and to close said circuit when the gate is opened.

17. In a motion picture apparatus, in combination two film supporting spindles, a film gate constructed in two separate portions, said film gate being positioned between said film supporting spindles, a fixed support for one of said portions, a movable support for the other said portion, means for moving said movable support relatively to said fixed support whereby the gate is closed or opened, means for feeding a film supported upon one of said spindles through said gate and toward the other of said spindles, a pilot lamp for said apparatus, a switch for said pilot lamp, and means for operating said switch by the movement of said movable support to close the circuit to said pilot lamp when the gate is opened.

18. In a motion picture apparatus, two film supporting members, a gate positioned between said film supporting members and comprising a plurality of sections one of which is movable relatively to another, means for feeding a film from one of said supporting members toward the other thereof through said gate, a pilot lamp for illuminating said gate for the purpose of facilitating the insertion of a film therein or its removal therefrom, a switch for said lamp, and control mechanism interlocking said switch and said movable section and necessarily effective for moving said movable section and operating said switch in timed relation.

19. In film handling apparatus in combination a film-gate constructed in two separate portions, a front portion and a rear portion, a fixed support for one of said portions, having a film-driving sprocket thereon, a support for the other said portion movable relatively to said fixed support and having a pair of film spools thereon, film-guides on said movable support to co-operate with said film-driving-sprocket to hold the film in driving engagement therewith when said movable support is moved to close the gate and to disengage the film therefrom when said support is moved to open the gate.

20. In film handling apparatus in combination a film-gate constructed in two separate portions, a front portion and a rear portion, a fixed support for a first said portion and having a film driving sprocket mounted thereon to rotate about an axis normal thereto and to have its periphery project beyond the face of said first gate portion, a second said gate portion shaped to receive and clear the said projecting portion of the film sprocket when the gate is closed, a slidable support for said second gate portion and having a member mounted thereon adapted to feed a film driven by said film driving sprocket, film guide rollers on said slidable support arranged to co-operate with said film driving sprocket to press the film in driving engagement therewith when the gate is closed and to be free of such co-operation when the gate is open and driving means on said fixed support arranged to be operatively connected with said member when the gate is closed and to be free from driving engagement therewith when the gate is open.

21. In film handling apparatus in combination a film-gate constructed in two separate portions, a front portion and a rear portion, a fixed support for a first said portion and having a film driving sprocket mounted thereon to rotate about an axis normal thereto and to have its periphery project beyond the face of said first gate portion, a second gate portion shaped to receive and clear the said projecting portion of the film sprocket when the gate is closed, a slidable support for said second gate portion and having a member mounted thereon adapted to feed a film driven by said film driving sprocket, film guide rollers on said slidable support arranged to co-operate with said film driving sprocket to press the film in driving engagement therewith when the gate is closed and to be free of such co-operation when the gate is open, a backwardly curved guide portion on said second gate portion and a forwardly curved guide piece co-operating therewith and projecting from the face of said second gate portion towards the said first gate portion and forming with said backwardly curved guide portion a wide mouthed slot when the gate is open to guide the film into the rear gate portion clear of the projecting face of the film driving sprocket.

22. In a film handling apparatus, a gate adapted to occupy open or closed positions, a film spool, a driving mechanism for said spool, means effective upon movement of the gate to open position for producing relative movement between the spool and driving means for rendering the driving means inoperative and effective upon movement of the gate to closed position to render said driving means operative, and means effective when said driving means is inoperative for rotating said spool in the opposite direction.

23. In a film apparatus, means for effecting bodily movement of a film, means to feed said film in one direction, means to feed said film in the opposite direction for rewinding, and means bringing said last two mentioned means into or out of effective operation by the movement of said first mentioned means.

24. In a film apparatus, supporting means for the entire mass of a film, means for effecting bodily movement of said supporting means, film feeding means, film rewinding means and connections whereby movement of said support controls the operation of said two last mentioned means.

25. In a film apparatus, a movable film support, means for feeding a film in one direction, means for feeding said film in the opposite direction, either of said means being brought into cooperative relationship with said film by a predetermined movement of said film support, and means for effecting movement of said film support.

26. In a film apparatus, a movable film support, means adapted at predetermined times to move a film in one direction, means adapted at other times to move said film in the opposite direction, and connections for controlling the operation of said means upon movement of said film support.

27. In a film handling apparatus, an openable gate comprising a fixed section and a section movable relative to said fixed section, a plurality of film spools bodily movable with said movable section, a plurality of driving means effective for driving one of said spools in one direction and another of said spools in the opposite direction, and means for moving said film spools to bring one of the spools into cooperative engagement with one of said driving means in timed relationship with the closing of said gate and for moving said film spools to bring another of the spools into cooperative engagement with another of said driving means in timed relationship with the opening of said gate.

28. Film apparatus comprising a film support adapted to occupy a plurality of positions, mechanism for feeding a fi'm in a projecting direction, mechanism for moving said film in a rewinding direction, means effective for actuating one of said mechanisms, when said support occupies one of said positions, and means effective for actuating the other of said mechanisms when said support occupies another of said positions.

29. In a motion picture apparatus, a spindle adapted to support a film while the same is being fed, said spindle being rotated by said film during said feeding cycle, a spindle upon which said film is wound during said feeding cycle and from which it is unrolled during the rewinding cycle, one end of the film being attached to said second mentioned spindle, means to rotate said first mentioned spindle in a contrary direction to rewind the film thereupon, means for connecting said rotating means and said spindle, said means including a driving element, a driven element, and means to move said elements into or out of operative relation with each other, and means including a yielding means to drive said rotating means from a source of power whereby at the conclusion of said rewinding cycle the end of the film is not torn loose from said second mentioned spindle.

30. A motion picture apparatus comprising a main frame upon one side of which are supported in spaced parallelism a spindle from which a film may be unrolled during the feeding cycle and upon which a film may be rewound after such feeding cycle and a spindle upon which a film may be wound during said feeding cycle and from which said film may be unrolled thereafter, said film being attached to both of said spindles, and upon the opposite side of which frame are disposed a spur shaft substantially parallel with said first mentioned spindle, means adapted to connect said shaft and said spindle at will, said means including a driving element, a driven element, and means to move said elements into or out of operative relation with each other, a driving means for said spur shaft, said driving means being yieldingly connected with said spur shaft whereby at the conclusion of the rewinding cycle said film is not torn from said second mentioned spindle.

31. In a motion picture apparatus, a main frame, two spindles disposed upon one side thereof and carried thereby adapted to support a film, means supported by said frame adapted to feed the film, means to rewind the film from one of said spindles to the other, spur shafts disposed upon the side of said frame opposite to that upon which said spindles are disposed and substantially parallel with said spindles, means effective to drive continuously both of said spur shafts, and means to connect successively each of said spur shafts and its appropriate spindle.

32. In a motion picture apparatus, a main frame, two spindles supported thereby at right angles thereto adapted to support a film, means to feed the film from one of said spindles to another, said means being disposed upon the same side of said frame as said spindles, an operating shaft for said feeding means positioned upon the opposite side of said frame from said feeding means and supported by said main frame in spaced parallelism thereto, a motor disposed upon the same side of said main frame as said operating shaft, a power shaft parallel to the axis of said motor and connected therewith and in spaced parallelism to said operating shaft, means to drive said operating shaft from said power shaft, a spur shaft disposed at approximately right angles with said power shaft and approximately parallel to said spindles, means for drivingly connecting said power shaft and said spur shaft, a spur shaft substantially parallel with one of said spindles, means for connecting said spur shaft with said spindle, whereby said spindle is driven thereby, a spur shaft substantially parallel with the other of said spindles, means for connecting said last previously mentioned spur shaft with said last previously mentioned spindle whereby said spindle is driven thereby, and means to drive said two last mentioned spur shafts from said first mentioned spur shaft, said means for connecting each of said spur shafts with its appropriate spindle being alternately operable.

33. In a motion picture apparatus, a supporting plate, a main frame disposed substantially parallel thereto, two spindles supported by said frame at right angles thereto adapted to support a film, means to feed said film from one of said supports to another, said means being disposed upon the same side of said frame as said spindles, an operating shaft for said feeding means positioned upon the opposite side of said frame from said feeding means and supported from said main frame in spaced parallelism thereto, a motor disposed upon the same side of said main frame as said driving shaft, a power shaft substantially in line with the axis of said motor and in spaced parallelism to said operating shaft, means to drive said operating shaft from said power shaft, a spur shaft disposed at substantially a right angle to said power shaft and substantially parallel to said spindles, means for drivingly connecting said power shaft and said spur shaft, a spur shaft disposed substantially parallel to one of said spindles, means operative to connect said last previously mentioned spur shaft with said spindle, a spur shaft substantially parallel with the other of said spindles, means operative to connect said last previously mentioned spur shaft with said spindle, and means to drive said two last mentioned spur shafts from said first mentioned spur shaft.

34. In a motion picture projector, in combination a film gate constructed in two separate portions, a fixed support for one of said portions, a movable support for the other said portion, means for moving said movable support relatively to said fixed support, an electric motor for driving said apparatus, a switch for said motor, and a connection between said means for moving said movable support and said switch for operating said switch by the movement of said moving means to break the circuit to said motor when the gate is opened and to close said circuit when the gate is closed.

35. In a motion picture projector, in combination a film gate constructed in two separate portions, a fixed support for one of said portions, a movable support for the other said portion, means for moving said movable support relatively to said fixed support, an electric motor for driving said apparatus, a switch for said motor, and means for operating said switch by the movement of said means for moving said movable support.

36. In a motion picture projector, an openable gate through which a film travels, control means for opening and closing said gate, means for feeding the film, a motor for operating said feeding means, a switch for said motor, and interlocked operating mechanism for said control means and said switch.

37. In a motion picture projector, a gate through which a film travels, said gate including a fixed section and a section movable relatively thereto, means for shifting said movable section into and out of cooperative relation with said fixed section film feeding means, a motor for operating said feeding means, a switch for said motor, and operating connections between said switch and said shifting means whereby said switch is maintained in open position while said sections are in relatively distant position.

38. In a motion picture projector, an openable film gate constructed in two separate portions, a fixed support for one of said portions, a movable support for the other said portions, a feeding member mounted upon said fixed support, powered mechanism for driving said feeding member mounted upon said fixed support, and control mechanism, said control mechanism, comprising an actuating member movable to two positions and connections between said actuating member and said powered driving mechanism and said actuating member and said movable support whereby upon the movement of said actuating member to one of said positions said powered driving mechanism is started and said movable support is moved toward said fixed support whereby said gate is closed and said feeding member operated and upon movement of said actuating member to the other of said positions said powered driving mechanism is stopped and said movable support is moved away from said fixed support whereby said gate is opened and said feeding member rendered inoperative.

39. In a film handling apparatus, an openable gate through which a film travels, toothed means for feeding the film therethrough, powered mechanism for driving said feeding means, and a member which upon movement to one position closes said gate and actuates said driving mechanism and upon movement to another position opens said gate and renders said driving mechanism inoperative, whereby access may be had to said gate and a film placed therein without danger of damage from the moving teeth of said feeding means.

40. In a motion picture projector, an apertured gate through which a film travels, said gate including a fixed member and a member slidable relatively thereto in a direction parallel to the optical axis of the aperture of said gate, means for moving said slidable gate member, film feeding means, powered mechanism for driving said feeding means, means for actuating said mechanism, and a connection between said movable member and said actuating means whereby the movement of said member operates said actuating means for controlling said mechanism, upon the movement of said moving means.

41. In a motion picture projector, a gate through which a film travels, said gate including a fixed member and a member movable relatively thereto, film feeding means, powered mechanism for driving said feeding means, an actuating member movable to a plurality of operating stations for controlling said apparatus in the manner desired, and operating connections between said actuating member said movable gate member and said powered mechanism whereby the actuation of said mechanism is necessarily controlled in timed relation to the movement of said movable gate member in accordance with the movement of said actuating member from one of said operating stations to another thereof.

42. In a motion picture projector, an openable gate through which a film travels, means effective for feeding the film therethrough, powered means for driving said feeding means, means for actuating said feeding means, and control mechanism, said control mechanism comprising an actuating member movable to a plurality of operating positions and connections between said actuating member and said gate and said actuating means which while said actuating member is positioned in one of said operating positions necessarily maintain said actuating means inoperative and said gate open.

43. A motion picture projector comprising film feeding mechanism, a motor for driving said mechanism, a switch for said motor, means for moving a film into operative relation with said mechanism, and interlocked control mechanism for said means and said switch, said control mechanism comprising an actuating member movable to a plurality of operating positions and connections between said actuating member and said moving means and said switch for operating said moving means and said switch upon the movement of said actuating member from one of said stations to another.

44. Apparatus comprising a toothed film feeding member, mechanism for operating said member, a motor for driving said mechanism, a switch for said motor, means for bodily removing the film from the teeth of said member, and interlocked control mechanism for said means and said switch.

45. Apparatus comprising a toothed film feeding member, mechanism for operating said member, a motor for driving said mechanism, a switch for said motor, means for rendering the teeth of said member inaccessible by the film, and interlocked control mechanism for said means and said switch.

46. Apparatus comprising film feeding mechanism, a motor for driving said mechanism, a switch for said motor, means for moving a film into operative relation with said mechanism, means for bodily removing the film from said mechanism, and interlocked control mechanism for said switch and both of said means.

47. In a motion picture projector, mechanism for moving a film to project or expose the same, means for starting the operation of said mechanism, means for bringing the film into operative relation with said mechanism, an actuating member movable to a plurality of operating stations for controlling said projector in the manner desired, and connections between said actuating member and both of said means for operating both of said means upon the movement of said actuating member from one of said stations to another.

48. Apparatus which comprises a toothed member adapted to engage the perforations of a film, means for driving said member whereby the film is fed, means for bodily removing the film from the teeth of said member, and control mechanism interlocking both of said means for stopping the operation of said driving means and operating said bodily removing means.

49. Apparatus comprising a toothed member adapted to engage the perforations of a film, powered mechanism for driving said member whereby the film is fed, means for starting the operation of said mechanism, means for rendering the teeth of said member inaccessible by the film, and interlocked control mechanism for both of said means.

50. In a film handling apparatus, a toothed member adapted to engage the perforations of a film, mechanism for driving said member whereby the film is fed, means for protecting the film from the teeth of said member, and interlocked control mechanism for said driving mechanism and said means.

51. Film feeding apparatus which comprises a toothed member adapted to engage the perforations of a film, mechanism for driving said member whereby the film is fed, means for bringing the film into operative relation with said toothed member, means for starting the operation of said mechanism, means for bodily removing the film from said toothed member, and interlocked control mechanism for all of said means.

52. In a film handling apparatus, a toothed film feeding member, powered mechanism for driving said member, means for rendering the teeth of said member inaccessible by the film, and a control member which upon movement to one position operates said means and renders said mechanism inoperative and upon movement to another position renders said means inoperative and starts the operation of said mechanism.

53. In a film handling apparatus, a delivery carrier, a take-up carrier, a toothed member for engaging a film, mechanism for driving said member whereby a film supported by said delivery carrier is fed therefrom toward said take-up carrier, a motor for driving said mechanism, a switch for said motor, means for bodily removing the film from engagement with the teeth of said member, mechanism for driving said delivery carrier whereby the film supported by said take-up carrier may be rewound therefrom by said delivery carrier, means for operatively connecting said delivery carrier and said mechanism for driving said delivery carrier, and interlocked control mechanism for both of said means and said switch.

54. In a film handling apparatus, a delivery carrier, a take-up carrier, a toothed member for engaging a film, mechanism for driving said member whereby a film supported by said delivery carrier is fed therefrom toward said take-up carrier, means for rendering said mechanism inoperative, means for bodily removing the film from engagement with the teeth of said member, mechanism for driving said delivery carrier whereby the film supported by said take-up carrier may be rewound therefrom by said delivery carrier, means for operatively connecting said delivery carrier and said mechanism for driving said delivery carrier, and interlocked control mechanism for all of said means.

55. In a film handling apparatus, a delivery carrier, a take-up carrier, a toothed member for engaging a film, mechanism for driving said member whereby a film supported by said delivery carrier is fed therefrom to said take-up carrier, mechanism for driving said take-up carrier whereby the film delivered thereto by said feeding member is wound thereupon, means for rendering said first mentioned mechanism inoperative, means for operatively disconnecting said take-up carrier and said second mentioned mechanism, means for bodily removing the film from engagement with the teeth of said member, mechanism for driving said delivery carrier whereby the film supported by said take-up carrier may be rewound therefrom by said delivery carrier, means for operatively connecting said delivery carrier and said mechanism for driving said delivery carrier, and interlocked control mechanism for all of said means.

56. In a film handling apparatus, a rewinding spindle, means for rotating said rewinding spindle, a take-up spindle, means for rotating said take-up spindle, a member adapted to feed a film from said rewinding spindle toward said take-up spindle, mechanism for operating said feeding member, a motor for driving said mechanism, a switch for said motor, and actuating mechanism which, when moved to one position forms an operative connection between said take-up spindle and said means for rotating said take-up spindle, maintains said rewinding spindle free from operative contact with said means for rotating said rewinding spindle, and operates said switch to close the circuit to said motor, and when moved to another position destroys the operative connection between said take-up spindle and said means for rotating said take-up spindle, forms an operative connection between said rewinding spindle and said means for rotating said rewinding spindle, and operates said switch to break the circuit to said motor.

57. In a film handling apparatus, a rewinding spindle, means for rotating said rewinding spindle, a take-up spindle, means for rotating said take-up spindle, a member adapted to feed a film from said rewinding spindle toward said take-up spindle, means for operating said feeding member, and actuating mechanism which, when moved to one position forms an operative connection between said take-up spindle and said means for rotating said take-up spindle, actuates said means for operating said feeding member, and maintains said rewinding spindle free from operative connection with said means for rotating said rewinding spindle, and when moved to another position forms an operative connection between said rewinding spindle and said means for rotating said rewinding spindle, renders inoperative said means for operating said feeding member, and maintains said take-up spindle free from operative connection with said means for rotating said take-up spindle.

58. In a film handling apparatus, a rewinding spindle, means for rotating said rewinding spindle, a take-up spindle, means for rotating said take-up spindle, a member adapted to feed a film from said rewinding spindle toward said take-up spindle, means for operating said feeding member, and actuating mechanism which when moved to one position forms an operative connection between said take-up spindle and said means for rotating said take-up spindle, and actuates said means for operating said feeding member, and when moved to another position forms an operative connection between said rewinding spindle and said means for rotating said rewinding spindle, and renders inoperative said means for operating said feeding member.

59. In a film handling apparatus, a delivery spindle, a take-up spindle, means for rotating said take-up spindle, a member adapted to feed a film from said delivery spindle to said take-up spindle, mechanism for operating said member, a motor for operating said mechanism, a switch for said motor, and actuating mechanism which when moved to one position forms an operative connection between said take-up spindle and said means for rotating said take-up spindle and operates said switch to close the circuit to said motor and when moved to another position destroys said operative connection and operates said switch to break the circuit to said motor.

60. In a film handling apparatus, a delivery spindle, a take-up spindle, means for rotating said take-up spindle, a member adapted to feed a film from said delivery spindle to said take-up spindle, mechanism for operating said member, a motor for operating said mechanism, a switch for said motor, and actuating mechanism operable to form an operative connection between said take-up spindle and said means for rotating said take-up spindle and to operate said switch.

61. In a film handling apparatus, a delivery spindle, a take-up spindle, a member adapted to feed a film from said delivery spindle toward said take-up spindle, mechanism for operating said member, a motor for operating said mechanism, a switch for said motor, means for operating said delivery spindle whereby a film may be rewound thereupon from said take-up spindle, and actuating mechanism which when moved to one position forms an operative connection between said delivery spindle and said means for rotating said delivery spindle and operates said switch to open the circuit to said motor.

62. In a film handling apparatus, a delivery spindle, a take-up spindle, a member adapted to feed a film from said delivery spindle toward said take-up spindle, mechanism for operating said member, means for operating said delivery spindle whereby a film may be rewound thereupon from said take-up spindle, and actuating mechanism operable to form an operative connection between said rewinding spindle and said means for rotating said rewinding spindle and to render said mechanism inoperative.

63. In a motion picture projector, an openable gate through which a film passes, means for closing said gate, mechanism for feeding the film, a motor for driving said mechanism, a switch for said motor, means for bringing the film into operative relation with said mechanism, an actuating member movable between a plurality of operating stations, and connections between said actuating member and both of said previously mentioned means and said switch for operating both of said means and said switch upon the movement of said actuating member from one of said stations to another.

64. In a motion picture projector, an openable gate through which a film passes, means for closing said gate, a member for feeding the film, mechanism for driving said member, means for starting the operation of said mechanism, means for bringing the film into operative relation with said member, and interlocked control mechanism, said control mechanism including an actuating member movable between a plurality of operating stations, and connections between said actuating member and said previously mentioned means for operating all of said means upon the movement of said actuating member from one of said stations to another.

65. In a film handling apparatus, a film container which is adapted for guiding a film, means for supporting said container upon said apparatus, a toothed member adapted to engage the perforations of a film, means for driving said member, an openable gate through which the film travels, means for bodily removing the film from the teeth of said member, and interlocked control means for rendering said driving means inoperative, actuating said means for bodily removing the film, and opening said gate.

66. In a film handling apparatus, a toothed member adapted to engage the perforations of a film, means for driving said member, an openable gate through which the film travels, means for bodily removing the film from the teeth of said member, and control means for rendering said driving means inoperative upon said member, actuating said means for bodily removing the film, and opening said gate.

67. Film feeding apparatus, comprising a delivery carrier, a take-up carrier, an openable gate disposed between said carriers, a toothed feeding member adapted for feeding a film from said delivery carrier through said gate toward said take-up carrier, means for opening said gate, means for removing the film from the teeth of said feeding member, means for placing said delivery carrier in operative connection with a source of power whereby a film supported thereby may be rewound thereby, and interlocked actuating mechanism for all of said means.

68. In a film handling apparatus, a toothed film feeding member, an openable gate through which the film travels, a member for taking up the film fed through said gate, means for driving said taking up member, means for bodily removing the film from the teeth of said feeding member, and control means for rendering said driving means inoperative, actuating said means for bodily removing the film, and opening said gate.

69. In a film handling apparatus, a gate comprising a plurality of sections one of which is movable relatively to another to open and close said gate, a spindle for winding a film which passes through said gate, driving mechanism, and means for operatively connecting said spindle and said driving mechanism whereby said spindle may be driven by said mechanism, said means for drivingly connecting said spindle and said mechanism including a driving and a driven motion-transmitting member one of which is movable into and out of operative relation with the other, and means linking said movable gate section and said movable motion transmitting member for positively moving said movable member into operative relation with said other motion transmitting member upon the movement of said movable gate section away from said fixed gate section whereby said spindle is operated when said gate is opened and for positively moving said movable member out of operative relation with said other motion transmitting member upon the movement of said movable gate section toward said fixed gate section whereby said spindle is rendered inoperative when said gate is closed.

70. In a film handling apparatus, a gate comprising a plurality of sections one of which is movable relatively to another to open and close said gate, a member for taking up a film which passes through said gate, driving mechanism, and means for operatively connecting said member and said driving mechanism whereby said member may be driven by said mechanism, said connecting means including a train of power transmitting members between said driving mechanism and said taking-up members one of which transmitting members is mounted for bodily movement with said movable gate section out of operative relation with another of said power transmitting members upon movement of said movable gate section away from said fixed section and into operative relation with said power transmitting member upon the movement of said movable gate section toward said fixed section whereby said taking-up member is rendered inoperative when said gate is opened and is rendered operative when said gate is closed.

71. In a film handling apparatus, a spindle adapted to support a film while the same is being fed, said spindle being rotated by said film during the feeding cycle, mechanism for rotating said spindle in a contrary direction to rewind the film thereupon, means for operatively connecting said mechanism and said rewinding spindle, a spindle upon which the film is wound during the feeding cycle and from which it is unrolled during the rewinding cycle, and a gate through which the film passes disposed between said spindles, said gate comprising a plurality of sections one of which is movable relatively to another, for opening and closing said gate, said operative connecting means including a train of power transmitting members between said driving mechanism and said rewinding spindle one of which power transmitting members is mounted for bodily movement with said movable gate section into and out of operative relation with another power transmitting member of said train upon movement of said movable gate section away from and toward said fixed gate section whereby said rewinding spindle is started and stopped in timed relation to the opening and closing of said gate.

72. In a film handling apparatus, a film gate through which a film may be fed, said film gate being constructed in two separate portions, a fixed support for one of said portions, a support for the other said portion which is movable for the purpose of opening and closing said gate, a spindle for winding a film which is fed through said gate, mechanism for driving said spindle, means for operatively connecting said driving mechanism and said spindle, said connecting means including a driven and a driving motion transmitting member one of which is movable into and out of operative relation with the other, said movable member being mounted upon said movable gate support for movement therewith, and means for moving said movable gate support whereby the operation of said spindle is started and stopped in timed relation to the opening and closing of said gate.

73. In a film handling apparatus, a spindle adapted to wind a film thereupon, a sectional gate through which the film is fed, means for moving one of said sections relatively to another, a driven motion transmitting element operatively connected with said spindle, a driving motion transmitting element, one of said motion transmitting elements being movable relatively to the other, means for bringing said movable element into operative connection with said relatively fixed element whereby said driving element may operate said spindle for the purpose of rewinding a film thereupon, and a connection between said last mentioned means and said movable gate section necessarily effective to move said movable element out of operative relation with said relatively fixed motion transmitting element upon the movement of said movable gate section toward said fixed gate section.

74. In a film handling apparatus, a sectional gate through which a film may be fed, means for moving one of the sections of said gate relatively to another, a member adapted to take up a film fed through said gate, driving mechanism, means for operatively connecting said taking-up member and said driving mechanism, said connecting means including a driven motion transmitting element and a driving motion transmitting element, one of said motion transmitting elements being movable relatively to the other, means for moving said movable motion transmitting element into and out of operative relation with said other motion transmitting element whereby said driving mechanism is rendered effective and ineffective upon said taking-up member, and a connection between said last previously mentioned means and said movable gate section necessarily effective to move said movable motion transmitting element out of operative relation with said other motion transmitting element upon the movement of said movable gate section away from said fixed gate section whereby said taking-up member is rendered inoperative when said gate is opened.

75. In a film handling apparatus, a fixed support and a support movable relatively thereto, a first film moving member, said member being mounted upon one of said supports, a film guide, a second film moving member, said guide and said second moving member being mounted upon the other of said supports, means for moving said movable support to either of two positions relative to said fixed support in one of which positions said guide and said first feeding member are situated in relatively distant relation whereby a film may be placed therebetween and in the other of which positions said guide and said first feeding means are positioned in relatively close relation whereby the film is pressed into driving relation therewith, means for operating both of said feeding means, and an actuating connection between said moving means and said operating means necessarily effective to render said operating means ineffective when said support is moved to said first mentioned position and to render said operating means effective when said support is moved to said second mentioned position.

76. In a film handling apparatus, a fixed support, a movable support, means for mounting said movable support upon said fixed support adjacent thereto for movement in a plane parallel therewith, a toothed film driving member, said member being mounted upon one of said supports and extending therefrom, a film winding member, film guiding means adapted to cooperate with said driving member, said winding member and said guiding means being mounted upon the support other than that upon which said driving member is mounted and extending therefrom in the same direction in which the axis of said driving member extends, a revoluble shaft for driving said driving member and said winding member, mechanism for driving said film winding member from said shaft, said mechanism including a driven element and a driving element, one of said elements being mounted upon the side of one of said supports opposite that from which said members and said guiding means extend, and the other of said elements being mounted upon the adjacent side of the other of said supports, and means for moving said movable support to one position wherein said film guiding means and said film driving member are situated in close relation for the purpose of pressing a film in driving relation with the teeth of said member and said driving and driven elements are disposed in cooperative relation for the purpose of driving said film winding member from said revoluble shaft or to another position wherein said film guiding members and said toothed member are situated in spaced relation whereby a film may be positioned therebetween and said driving and driven elements are removed from such cooperative relation whereby said winding spindle is maintained inoperative.

77. In a film handling apparatus, a fixed support and a support movable relatively thereto, a first film moving means mounted upon said fixed support and adapted to move a film in one direction, a second film moving means mounted upon said movable support and adapted to move the film in the other direction, a driven motion transmitting element connected with said second moving means and mounted upon said movable support, a driving motion transmitting element mounted upon said fixed support, means for driving said first moving means, means for actuating said driving means, a connection between said actuating means and said movable support, means for moving said movable support relatively to said fixed support to one position wherein said motion transmitting elements are disposed in cooperative relation and said connection renders said actuating means inoperative and to another position wherein said motion transmitting elements are removed from such cooperative relation and said connection renders said actuating means operative.

78. In a film handling apparatus, a fixed support and a support movable relatively thereto, film moving means mounted upon said fixed support, film moving means mounted upon said movable support, driving mechanism for both of said means, an actuating connection between said mechanism and said movable support, means for operatively connecting one of said moving means and said mechanism whereby said moving means may be driven by said mechanism, said last mentioned connective means including a motion transmitting member positioned upon said movable support and a motion transmitting member positioned upon said fixed support, and means for moving said movable support to one position wherein said actuating connection necessarily renders said driving mechanism effective and said motion transmitting elements are situated in cooperative relation and to another position wherein said actuating connection necessarily renders said driving mechanism ineffective and said motion transmitting elements are removed from such cooperative relation.

79. In a film handling apparatus, a first support, a second support mounted upon said first support in spaced parallelism therewith, a movable plate mounted upon said second support adjacent thereto for movement in a plane parallel therewith, a film gate constructed in two separate portions a fixed portion and a portion movable relatively thereto, said fixed portion being located on the other side of said second support from said first support and said movable portion being secured to and movable by said movable plate and extending therefrom in a direction away from said first support, a member for feeding a film through said gate, said member being located on the same side of said second support as said fixed gate portion, a member for taking up the film fed through said gate, said member being mounted upon said plate for bodily movement therewith and extending therefrom in a direction away from said first support, gearing for operating said members, said gearing being mounted between said fixed supports, and means for moving said plate.

80. In a film handling apparatus, a first support, a second support mounted upon said first support in spaced parallelism therewith, a movable plate mounted upon said second support adjacent thereto for movement in a plane parallel therewith, a film gate constructed in two separate portions a fixed portion and a portion movable relatively thereto, said fixed portion being located on the other side of said second support from said first support and said movable portion being secured to and movable by said movable plate and extending therefrom in a direction away from said first support, a member for taking up the film fed through said gate, said member being mounted upon said plate for bodily movement therewith and extending therefrom in a direction away from said first support, gearing for operating said member, said gearing being mounted between said fixed supports, and means for moving said plate.

81. In a film handling apparatus, the combination of a film gate constructed in two separate portions, a front portion and a rear portion, a fixed support for one of said portions from one side of which support said portion laterally extends, a movable support for the other said portion from which support said other portion laterally extends in the same direction as that in which said first portion extends, means for mounting said movable support upon said fixed support adjacent thereto for movement relative thereto in a plane substantially parallel therewith, a member adapted to feed a film through said gate, said member being operable upon an axis extending from said supports and located on the same side of said supports as that from which said gate portions extend, a member adapted to take up a film which is fed through said gate by said feeding member, said take up member being mounted upon said movable support for bodily movement therewith and extending therefrom substantially parallel to said axis of said other member and in the same direction, and driving mechanism including gearing operable upon fixed axes and a motion transmitting connection between said gearing and said take-up member, said gearing and said connection being situated upon the side of said fixed support opposite that from which said gate portion and said members extend.

82. In a film handling apparatus, a first supporting plate, a second supporting plate, said first and second plates being secured together in spaced parallelism, a third plate mounted upon said second plate adjacent thereto for movement relative thereto in a plane parallel therewith, a first film moving member operable upon a fixed axis and located on the other side of said second plate from said first plate, fixed means for guiding a film relatively to said first member, said guiding means being located on the same side of said second plate as said first member and extending therefrom in a direction substantially parallel to the axis of said first member, movable guiding means adapted for cooperation with said first member, a second film moving member, said second member and said movable guiding means being supported and bodily moved by said movable plate and extending therefrom in the same direction as that in which the first member and said first mentioned guiding means extend, mechanism for driving both of said moving members, said mechanism including gearing positioned between said fixed plates and a connection for transmitting power from said gearing to said second member, said connection including a driven motion transmitting element attached to said second member and supported by said movable plate and a driving motion transmitting element supported upon one of said fixed plates therebetween, and means for moving said movable plate to one position wherein said movable guiding means is co-operatively positioned relatively to said fixed guiding means and said first member whereby a film is directed thereto and pressed into driving relation therewith, and to another position wherein said movable guiding means is positioned relatively distantly from said fixed guiding means and said first member whereby a film may be removed from or inserted into the space therebetween.

83. Film handling apparatus including an enclosing casing with an opening at one side, a supporting frame, means for removably seating said frame upon said casing, said frame comprising two plates secured together in spaced parallelism and being so constructed that one of said plates, when said frame is seated upon said casing, closes said opening and the other of said plates is disposed inwardly of said opening within the enclosure of said casing, a plate mounted upon one of said fixed plates adjacent thereto and adapted to longitudinal movement relatively thereto, a revoluble film moving member mounted upon said movable plate and extending laterally therefrom in both directions, a film supporting portion upon that part of said member which extends away from said fixed plates, a gear upon the part of said member which extends in the other direction, a gate extending from the one of said fixed plates upon which said movable plate is mounted in the direction in which said film supporting part extends, said gate comprising a fixed portion and a portion movable relatively thereto, said movable portion being supported and moved by said movable plate, mechanism supported between said fixed plates and cooperating with said gear for operating said member for moving a film which travels between said gate portions, and means for moving said movable plate for the purpose of opening or closing said gate.

84. Film handling apparatus including an enclosing casing with an opening at one side, a supporting frame, means for removably seating said frame upon said casing, said frame comprising two plates secured together in spaced parallelism and being so constructed that one of said plates, when said frame is seated upon said casing, closes said opening and the other of said plates is disposed inwardly of said opening within the enclosure of said casing, a film gate constructed in two separate portions, a front portion and a rear portion, one of said portions being located on the side of one of said plates relatively distant from said other plate and extending laterally therefrom in a direction away from said other plate, a movable plate for supporting the other said gate portion from one side of which plate said other portion laterally extends in the same direction as that in which said other gate portion extends, means for mounting said movable plate upon the one of said fixed plates from which said gate portions extend adjacent to said fixed plate for movement relative thereto in a plane parallel therewith, a member adapted to feed a film through said gate, said member being revoluble upon an axis normal to said plates and extending in the same direction as that in which said gate sections extend, a member adapted to take up a film which is fed through said gate by said feeding member, said take-up member being mounted upon said movable plate for movement therewith and extending therefrom substantially parallel to the axis of said feeding member and in the same direction, driving mechanism for said feeding member and said take-up member, said mechanism including gearing supported upon fixed axes between said plates and removable therewith and a connection for transmitting power from said gearing to said take-up member, said connection being situated between said fixed plates and removable therewith.

85. Film handling apparatus including an enclosing casing with an opening at one side, a supporting frame, means for removably seating said frame upon said casing, said frame comprising two supports secured together in spaced parallelism and being so constructed that one of said supports, when said frame is seated upon said casing, closes said opening and the other of said supports is disposed inwardly of said opening within the enclosure of said casing, a film gate constructed in two separate portions, a fixed portion and a movable portion, said fixed portion being located upon the side of one of said supports and extending laterally therefrom in a direction away from said other support, a movable support for said movable gate portion from one side of which support said portion laterally extends in the same direction as that from which said other gate portion extends, means for mounting said movable support upon said fixed support from which said fixed gate section extends and adjacent thereto for movement relative thereto in a plane parallel therewith, a member adapted to feed a film through said gate, said member being revoluble upon an axis normal to said supports and extending in a direction substantially parallel to that in which said gate section extends, driving mechanism for said feeding member, said mechanism including gearing, said gearing being situated between said first and second mentioned fixed supports and being removable therewith, and a motor for driving said gearing, said motor being positioned upon said frame inwardly of said casing and removable with said frame.

86. Film handling apparatus including an enclosing casing with an opening at one side, a supporting frame, means for removably seating said frame upon said casing, said frame comprising two plates secured together in spaced parallelism and being so constructed that one of said plates, when said frame is seated upon said casing, closes said opening and the other of said plates is disposed inwardly of said opening within the enclosure of said casing, a movable plate, means for mounting said movable plate upon one of said fixed plates adjacent thereto for movement relative thereto in a plane parallel therewith, a feeding member, a guiding member adapted to press a film into driving relation with said feeding member, said feeding member being mounted upon one of said two last previously mentioned plates for revolution upon an axis normal thereto, and said guiding member being mounted upon the other of said last two previously mentioned plates, said members extending from said last two previously mentioned plates in a direction away from said first above mentioned plate, a motor, and gearing for transmitting power from said motor to said member, said gearing and said motor being mounted upon said frame and being positioned upon the side of said fixed plate, upon which said movable plate is mounted, other than that from which said movable gate section and said member extend, and means for moving said movable plate relatively to said fixed plate whereby said feeding member and said guiding member are moved into and out of cooperative relation.

87. Film handling apparatus including an enclosing casing with an opening at one side, a supporting frame, means for removably seating said frame upon said casing, said frame comprising two plates secured together in spaced parallelism and being so constructed that one of said plates, when said frame is seated upon said casing, closes said opening and the other of said plates is disposed inwardly of said opening within the enclosure of said casing, and operating mechanism, said mechanism including a motor and gearing for transmitting power therefrom, said motor and said gearing being mounted upon said frame for bodily movement therewith and, when said frame is seated upon said casing, being disposed inwardly of said opening within the enclosure of said casing.

88. Film handling apparatus including an enclosing casing with an opening at one side, a supporting frame, means for removably seating said frame upon said casing, said frame comprising two plates secured together in spaced parallelism and being so constructed that one of said plates, when said frame is seated upon said casing, closes said opening and the other of said plates is disposed inwardly of said opening within the enclosure of said casing, a pair of revoluble film spools removably carried by the frame on transverse axes and disposed in vertically spaced edgewise relation to the side of the one of said plates relatively distant from the other said plates, means for feeding a film in the path between said spools, and gearing carried by said frame between the plates thereof for driving said feeding means and one of the film spools.

89. Film handling apparatus including an enclosing casing with an opening at one side, a supporting frame, means for removably seating said frame upon said casing, said frame comprising two plates secured together in spaced parallelism and being so constructed that one of said plates, when said frame is seated upon said casing, closes said opening and the other of said plates is disposed inwardly of said opening within the enclosure of said casing, a pair of revoluble film spools removably carried by the frame on transverse axes and disposed in vertically spaced edgewise relation to the side of one of said plates relatively distant from the other said plate, means for feeding a film in the path between said spools, gearing carried by said frame between the plates thereof for driving said feeding means and one of the film spools, and a motor for driving said gearing carried by said frame and removable therewith.

90. Film handling apparatus including an enclosing casing with an opening at one side, a supporting frame, means for removably seating said frame upon said casing, said frame comprising two plates secured together in spaced parallelism and being so constructed that one of said plates, when said frame is seated upon said casing, closes said opening and the other of said plates is disposed inwardly of said opening within the enclosure of said casing, an openable gate located upon the side of one of said plates relatively distant from the other of said plates, means for opening or closing said gate positioned upon said side of said plate, a pair of revoluble film spools removably carried by the frame on transverse axes and disposed in vertically spaced edgewise relation upon said side of said frame, devices for feeding a film through said gate from one of said film spools to the other, and gearing carried by said frame between the plates thereof driving said feeding devices and at least one of the film spools.

91. In motion picture apparatus having means for advancing a film and take-up means for said film, common driving means for said film advancing mechanism and said take-up means, a clutch between said driving means and said take-up means, and means for necessarily rendering the film advancing means inoperative when the clutch is rendered inoperative.

92. In a motion picture apparatus, mechanism including means for advancing film, a rotating take up member for said film, a motor, driving connections from said motor to said means and member, means for disconnecting said member from the rest of said mechanism leaving it free to spin, a switch for said motor, and a connection between said switch and said disconnecting means necessarily rendering said disconnecting means inoperative when said switch is positioned in circuit closing position.

93. In a motion picture apparatus, mechanism including means for advancing film, a rotating take up member for said film, a motor, driving connections from said motor to said means and member, means for disconnecting said member from the rest of said mechanism leaving it free to spin, a switch for said motor, and a connection between said switch and said disconnecting means necessarily rendering said disconnecting means operative when said switch is positioned in circuit opening position.

94. In a film handling apparatus, a film advancing means, a film take up means, a rotary member, a motor for driving said member, a switch for said motor, a driving connection between the member and the film advancing means and a disconnectible driving connection between the member and the take up means, and means preventing said disconnectible driving connection from being disconnected when said switch is in circuit closing relation to said motor.

95. In a motion picture apparatus, mechanism including means for advancing film, two rotatable shafts adapted to have film reels seated thereon, a motor, driving connections from said motor to said means and to one of the shafts whereby film may be advanced through the apparatus and wound on a reel on said shaft, means for disconnecting said shaft from the rest of the mechanism leaving it free to spin, a switch for rendering said motor inoperative upon said film advancing means, a connection between said disconnecting means and said switch necessarily rendering said disconnecting means operative when said switch is positioned in circuit opening relation to said motor, and means whereby the other of the shafts may be turned, to rewind thereon film from a reel on the first shaft.

96. In a motion picture apparatus, mechanism including means for advancing film, a rotating take-up member for said film, a motor, driving connections from said motor to said means and member, means for disconnecting said member from the rest of the mechanism leaving it free to spin, a separate means for rendering said motor ineffective upon said film advancing means, and a connection between said disconnecting means and said means for rendering said motor ineffective necessarily rendering said disconnecting means inoperative when said means for rendering said motor ineffective is inoperative.

97. In a motion picture apparatus, means for advancing film through said apparatus and take up means for said film after it has been advanced, mechanism driven by said motor for operating said film advancing means and said take up means, means for rendering said motor effective or ineffective upon said mechanism, means including a disconnectible element for operatively connecting said mechanism and said take-up means, said two last mentioned means being so related that when said motor is rendered ineffective upon said mechanism said disconnectible element is necessarily operated to destroy the operative connection between said mechanism and said take-up means.

98. In motion picture apparatus, a film advancing means, a film take up means, a rotating member driven by a motor, means for rendering said motor effective or ineffective upon said member, a driving connection between said member and said film advancing means, a disconnectible driving connection between said member and said take up means, and means preventing the last named driving connection from being disconnected when said motor is effective upon said member.

99. In motion picture apparatus, film advancing means, film take up means, a rotating member driven by a motor, means for rendering said motor effective or ineffective upon said rotating member, a clutch connection between said member and said take up means, a member controlling said means for rendering said motor effective or ineffective upon said rotating member, said control member being operative to maintain the clutch operative when said motor is effective upon said rotating member.

100. In motion picture apparatus, film advancing means, film take up means, a rotating member driven by a motor, means for rendering said motor effective or ineffective upon said rotating member, a clutch connection between said member and said take up means, a member controlling said means for rendering said motor effective or ineffective upon said rotating member, said control member being operative to maintain the clutch inoperative when said motor is ineffective upon said rotating member.

101. In a motion picture apparatus, mechanism including means for advancing film, two rotatable shafts adapted to have film reels seated thereon, a motor, driving connections from said motor to said means and to one of the shafts whereby film may be advanced through the apparatus and wound on a reel on said shaft, means for disconnecting said shaft from the rest of the mechanism leaving it free to spin, a separate means for rendering said motor ineffective upon said film advancing means, a connection between said means for rendering said motor ineffective and said disconnecting means necessarily rendering said disconnecting means inoperative when said motor is rendered effective upon said film advancing means, and means whereby the other of the shafts may be turned, to rewind thereon film from a reel on the first shaft.

102. In a film handling apparatus, a supporting plate, an apertured gate, a source of light, a condensing lens, an objective lens, said source and said lenses cooperating with the aperture of said gate, and a member for engaging the film and feeding it through said gate past the aperture thereof, all of said parts being mounted upon said plate for the purpose of reducing unwanted relative movement therebetween.

103. In a film handling apparatus, a first supporting plate, a second supporting plate mounted thereupon for sliding movement relative thereto, a gate including a plurality of apertured sections one of which is movable relatively to another, a member for feeding a film between said sections of said gate, and a source of light for cooperation with the film at the aperture of said gate, said feeding member and a relatively fixed section of said gate being mounted upon said first plate and said source of light and a relatively movable section of said gate being mounted upon said second plate, whereby upon the movement of said second plate said movable gate section and said source of light are moved as a unit and unwanted relative movement therebetween is prevented.

104. In a motion picture apparatus, two film supporting members, a gate positioned between said members, means for feeding a film from one of said members through said gate toward the other thereof, a main light source of relatively high intensity adapted to project an image from a film as it is fed through said gate, a support for said light source, a secondary light source of relatively low intensity adapted to illuminate said gate for the purpose of facilitating the positioning of a film therein, said secondary light source being positioned independently of said support for said main light source and relatively distantly therefrom, and means whereby said secondary light source is rendered ineffective for illuminating said gate when said main light source is rendered effective upon the film in said gate for projecting an image therefrom and said secondary light source is rendered effective for illuminating said gate when said main light source is rendered ineffective for projecting an image from the film.

In testimony whereof we have signed our names to this specification.

HERBERT GEORGE PONTING.
GEORGE WILLIAM FORD.